May 17, 1927.
T. J. RILEY
1,629,308
MANUALLY PROPELLED VEHICLE
Filed Nov. 3, 1926
2 Sheets-Sheet 2
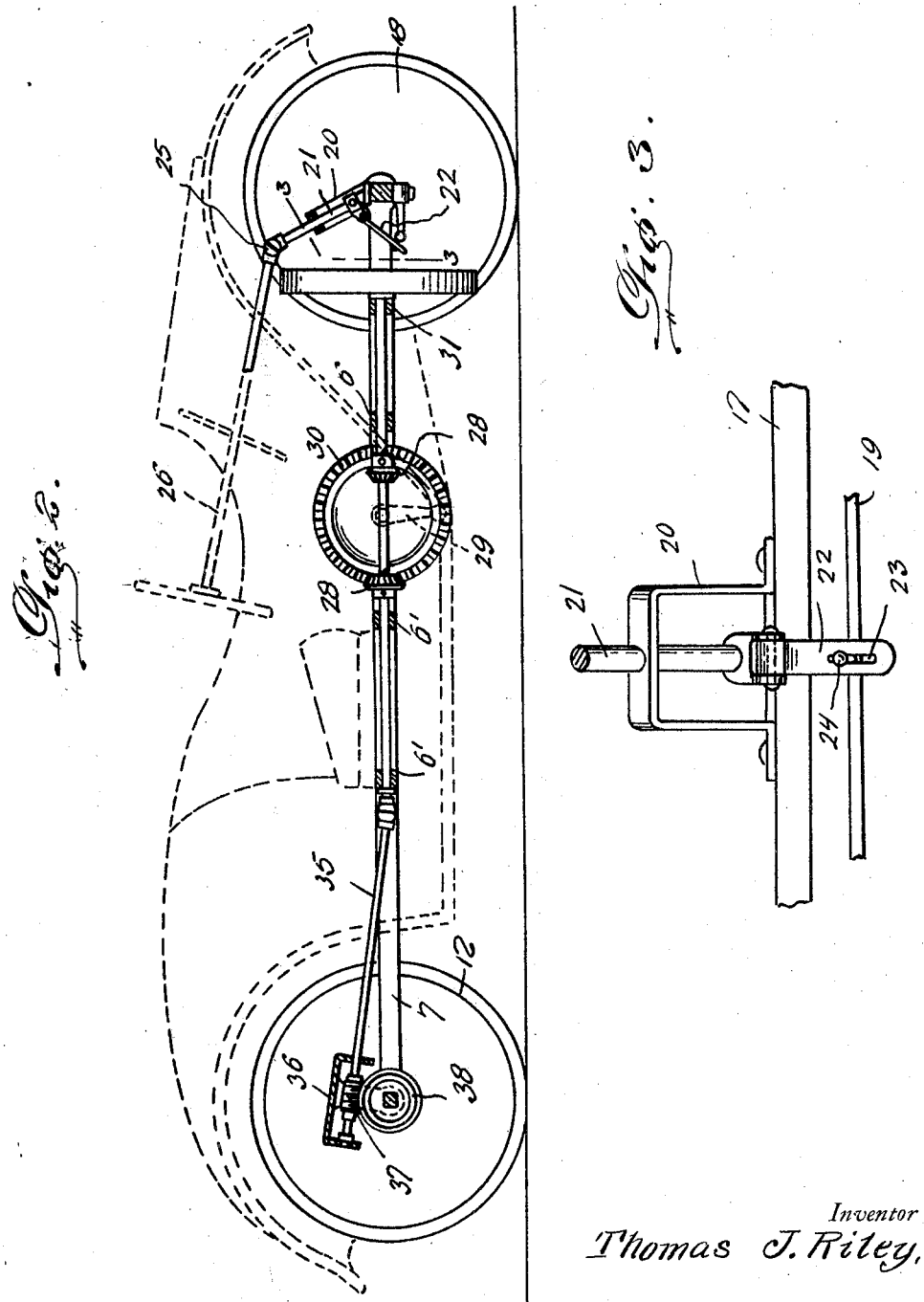
Inventor
Thomas J. Riley,
By Clarence A. O'Brien
Attorney Patented May 17, 1927.

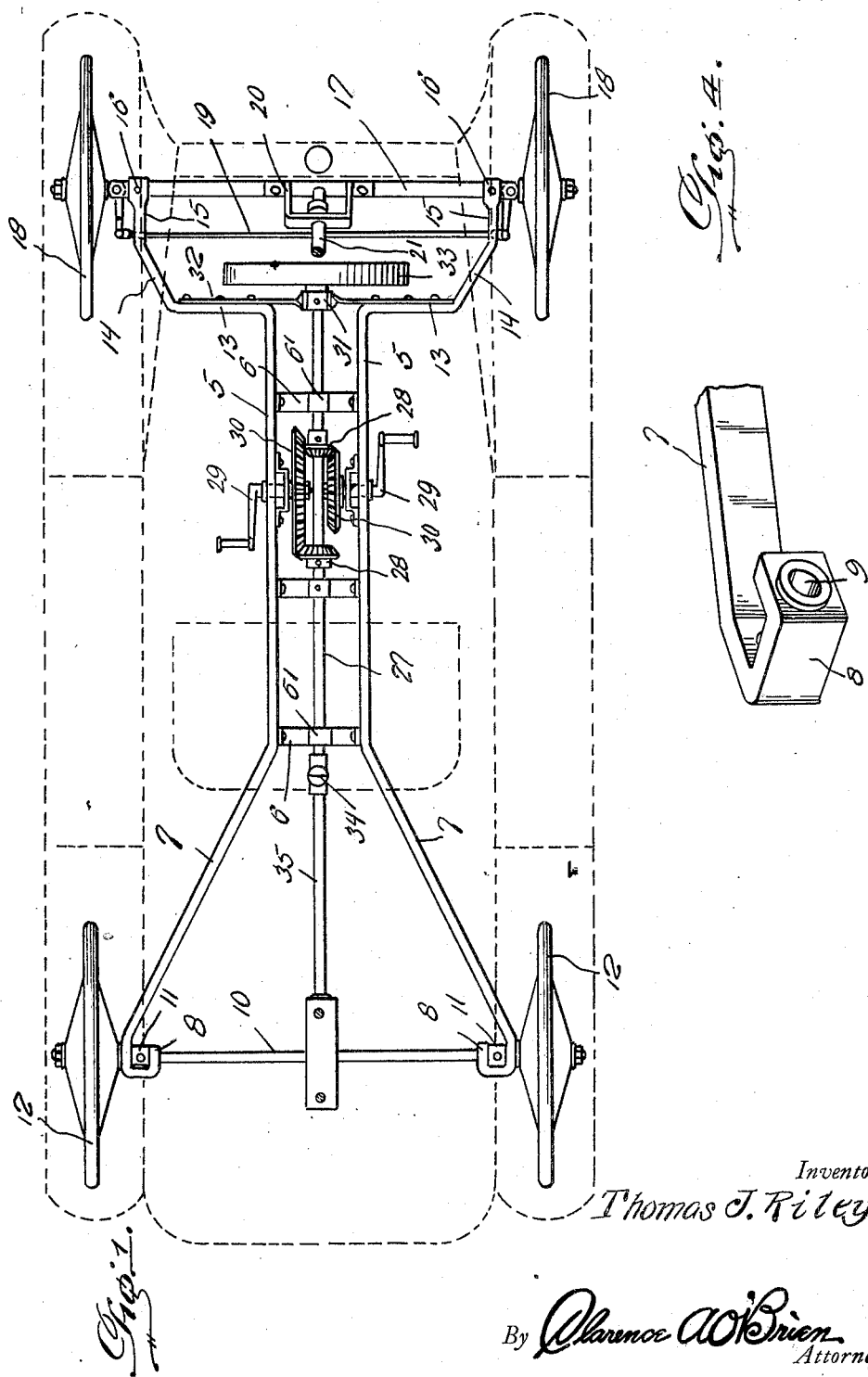

1,629,308

UNITED STATES PATENT OFFICE.

THOMAS J. RILEY, OF PHILADELPHIA, PENNSYLVANIA.

MANUALLY-PROPELLED VEHICLE.

Application filed November 3, 1926. Serial No. 146,027.

This invention relates to new and useful improvements in vehicles of the manually propelled type and has for its primary object to provide such a device that may have disposed upon the frame thereof a body in simulation of the body of an automobile, and that is so constructed as to permit of the operation of the vehicle by the occupant thereof for thus providing a pleasure device for both children and grownups.

One of the primary objects of the invention is to provide a vehicle of this character wherein the frame bars thereof are so constructed to provide means at the opposite ends thereof whereby the opposite ends of the front and rear axle of the vehicle may be directly connected thereto so that the vehicle will have the appearance of the underslung body type.

A still further and important object is to provide a manually propelled vehicle that may be operated at a moderate rate of speed by the occupant, and this without requiring unusual exertion on the part of the operator.

Other objects will become apparent as the nature of the invention is better understood, the same comprising the novel form, combination, and arrangement of parts hereinafter more fully described, shown in the accompanying drawings and claimed.

In the drawings wherein like reference characters indicate corresponding parts throughout the several views:

Figure 1 is a plan view of a manually propelled vehicle constructed in accordance with the present invention, the body which may be of any conventional design is disclosed in dotted lines.

Figure 2 is a longitudinal section thereof, the body being again disclosed in dotted lines.

Figure 3 is an enlarged fragmentary vertical section taken substantially upon the line 3—3 of Figure 2 for more clearly disclosing the steering connection between the spindle arm connecting rod and the steering shaft, and Figure 4 is an enlarged perspective of the rear end of one of the frame bars for more clearly disclosing the boxing formation of said end of the bar for providing a bearing support for the rear axle of the vehicle.

Now having particular reference to the drawings, my novel vehicle consists of a pair of metallic frame bars 5—5 of predetermined length, the central portions of which are in narrow spaced parallel relation interconnected at a plurality of points by cross members 6. The rear ends of these frame bars 5—5 converge outwardly as at 7—7, and the extreme rear ends thereof are so bent as to provide boxings 8—8 the side walls of which are formed with registering openings for receiving bushings 9, see Figure 4. Mounted within the boxings 8—8 of the outwardly converging ends 7—7 of said frame bars 5—5 is a rotating rear axle 10 provided with a pair of stop collars 11—11 arranged within the boxings 8—8 to prevent longitudinal movement of the axle as clearly disclosed in Figure 1.

Mounted upon the extreme outer ends of said axle 10 are traction wheels 12—12.

At the forward ends of the spaced parallel portions of the frame bars, the same are bent outwardly at right angles as at 13—13 after which the bars are bent in outwardly converging relation as at 14—14 and thence straight forwardly as at 15—15, the same being provided at the extreme outer ends thereof with collars 16—16 within which are secured the opposite ends of a square shaped stationary front axle 17, the extreme ends of which are constructed for permitting the pivotal attachment of generally conventional spindle knuckles upon the spindles of which are arranged the front wheels 18—18 of the vehicle, the arms of these knuckles being interconnected by a cross rod 19, the longitudinal movement of which controls the movement of the wheels 18—18 so as to steer the vehicle.

Upon the top side of the front axle 17 is a rearwardly inclined U-shaped bracket 20 through which extends an inclined stub shaft 21 to the lower end of which is connected an arm 22 that is provided with a longitudinal slot 23 through which a headed pin 24 associated with the steering connecting rod 19 passes as in Figure 3. The upper end of the shaft 21 is connected by a universal joint 25 to the inner end of a steering rod 26 that extends rearwardly in inclined manner and terminates adjacent the driver's seat within the body of the vehicle, as indicated by the dotted lines in Figure 2, said end of said steering rod being equipped with a suitable steering wheel as disclosed in said figure.

Journaled through central bearings 6' in the connecting arms 6 between the parallel portions of the frame bars 5—5 is a power shaft 27 to the center of which is secured a pair of spaced beveled gears 28—28 of slightly varying sizes. Journaled through openings in the frame bars 5—5 between said bevel gears 28—28 are foot cranks 29—29 upon the inner ends of which are larger bevel gears 30—30 also of varying sizes as clearly indicated in Figure 1. The smaller foot crank attached gear 30 has mesh with the smaller shaft attached gear 28, whereas the larger gear 30 has mesh with the larger gear 28 upon said shaft. The ratio between the intermeshed gears is identical.

The forward end of the shaft 27 is journaled within a bearing 31 provided intermediate the ends of a cross bar 32 that interconnects the right angular portions 13—13 at the forward ends of the frame bars 5—5. Upon the extreme forward end of said shaft 27 is a fly wheel 33 for imparting momentum to the shaft 27 and for other purposes well known.

Connected to the rear end of the power shaft 27 by universal joints 34 is a driven shaft 35, the rear end of which is journaled within a boxing 36 secured to and in position above the center of the rear axle 10. Within this boxing 36 said driven shaft 35 is provided with a worm 37 that has mesh with a worm gear 38 keyed to the center of the axle as clearly disclosed in Figure 2.

Obviously a rotation of the foot cranks 29—29 will impart rotation to the power shaft 27, and thence the driven shaft 35 causing the rotation of the rear axle 10 and the ground engaging traction wheels 12—12 for propelling the vehicle over the surface of the ground.

In view of the foregoing description when considered in conjunction with the accompanying drawings, it will at once be appreciated by those skilled in the art that I have provided a highly novel, simple, and efficient manually propelled vehicle that is well adapted for all the purposes heretofore designated and even though I have herein shown and described the invention as consisting of certain detail structural elements it is nevertheless to be understood that some changes may be made therein without departing from the spirit of the invention and the scope of the appended claims.

Having thus described the invention, what I claim as new and desire to secure by Letters Patent is:—

1. In a vehicle of the character described, a pair of frame bars having parallel spaced relation intermediate their ends the rear ends of said bars being bent in outwardly converging relation, while the forward ends thereof are so bent as to provide a pair of widely separated arms, a stationary front axle secured between the ends of the arms, steering wheels pivotally mounted at the ends of the axle, a rotating rear axle mounted between the rear ends of the bars and having traction wheels at the opposite ends thereof, a drive shaft journaled longitudinally between the bars, a drive connection between the rear ends of the shaft and the rear axle, and manually controlled means for rotating said drive shaft.

2. In a vehicle of the character described, a pair of frame bars so bent as to provide a pair of spaced parallel portions intermediate the ends thereof, the forward ends of the bars being bent to widely separated positions for providing a pair of arms at the forward ends of the bars, the rear ends of the bars being bent to outwardly converging relation, and having formed at the extreme ends thereof boxings, a stationary axle mounted between the arms of the forward ends of the bars, steering wheels pivotally secured to the opposite ends of said front axle, a rotating rear axle journaled to the boxing at the rear ends of the arms and upon the opposite ends of which are traction wheels, means interconnecting the spaced parallel portions of the bars, a horizontal drive shaft journaled through bearings in the interconnecting means between the parallel portions of the bars, a driving connection between the rear ends of the shaft and the rear axle, and manually operable means for imparting rotation to said drive shaft.

3. In a vehicle of the character described, a pair of frame bars having parallel spaced relation intermediate their ends, the rear ends being bent to outwardly converging relation, while the forward ends thereof are so bent as to provide a pair of widely separated arms, a stationary front axle secured between the ends of the arms, steering wheels pivotally mounted at the ends of the axle, boxings formed at the ends of the converging portions of said bars, a rotating rear axle mounted at its opposite ends within said boxing, and having traction wheels upon the ends thereof, a drive shaft journaled longitudinally between the bars, a drive connection between the rear end of the shaft and the rear axle, and manually control means for rotating said drive shaft.

In testimony whereof I affix my signature.

THOMAS J. RILEY.